Jan. 5, 1954 B. SIEGRIST ET AL 2,664,844
SOLDERING DEVICE
Filed April 17, 1951

Inventors
Bruno Siegrist
Charles Wakker
By Robert E. Burns
Attorney

Patented Jan. 5, 1954

2,664,844

UNITED STATES PATENT OFFICE 2,664,844

SOLDERING DEVICE

Bruno Siegrist and Charles Wakker, Geneva, Switzerland, assignors to Usine Genevoise de Degrossissage d'Or, Geneva, Switzerland, a firm Application April 17, 1951, Serial No. 221,459

Claims priority, application Switzerland April 21, 1950

1 Claim. (Cl. 113—110)

For soldering or brazing two wires or two metal strips together it is necessary to provide a device which keeps them together during the operation; this device may be external to the solder (setting) or on the other hand it may be incorporated in the solder, as in the case of certain wire-clamps. These latter may be clamped by the pressure of a pair of hand-pliers or by pressure screws. When the setting or wire-clamp is in place, soldering can be effected by the application of solder, heat, and a suitable flux for deoxidising the metal.

In known soldering devices, the channel surrounding the wire to be soldered is formed in such a manner that the solder is on the inside and the joint therefore loses its rigidity at the moment of soldering because the solder on becoming liquid permits play between the wires and the primary metal of the channel.

In order to avoid this disadvantage the present invention relates to a soldering device more especially for electrical conductors, characterised by the feature that it consists of malleable metal plate curved in such a manner as at least partly to surround the members to be soldered, this plate consisting of two metal layers, of which the inside layer is intended to clamp the members to be soldered and has a melting point considerably higher than that of the outside layer, which acts as solder.

Several embodiments of the device according to the invention are illustrated by way of example in the accompanying drawings, in which.

Figures 2, 6:
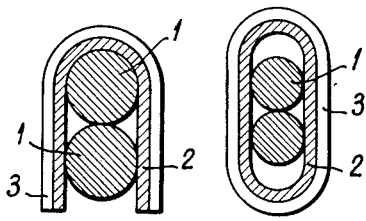
Figure 7:
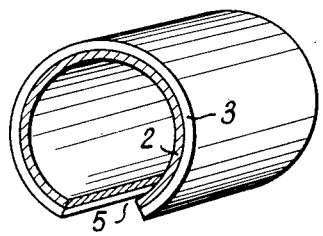
Figure 8:
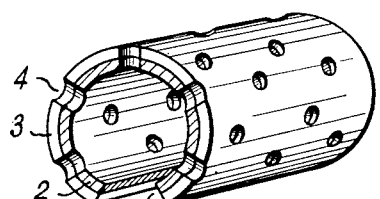
Figure 5:
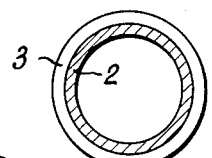

Figures 5 and 6 relate to a tubular device with a continuous lateral surface;

Figures 7 and 8 relate to a tubular device with a longitudinal slit; and

Figure 9:
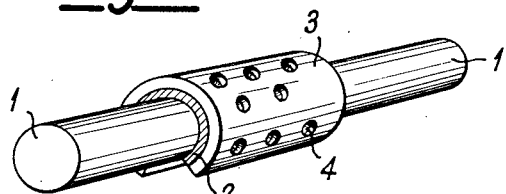
Figure 10:
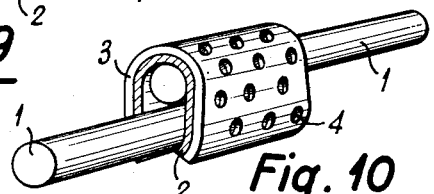

Figures 9 and 10 illustrate, in perspective, two methods of assembling the conducting wires in the soldering device.

The device illustrated in Figures 1 to 4 consists of a channel of thin, malleable composite metal plate curved in such a way as partly to surround the conductors 1 to be soldered and to clamp them. This plate is composed of an inner primary metal layer 2 resistant to the soldering temperature and of an outer metal layer 3 constituting the solder. These two metals are assembled by hot plating or by any other similar method.

The thickness of the bimetallic plate and the relative thicknesses of its two constituents are made such that the two wires or strips to be soldered are assembled rigidly and that the exact quantity of solder needed is present. It is also possible for one of the elements of the bimetallic plate to consist of a galvanic deposit deposited on the other element.

After the soldering device has been set in place and clamped on the wires to be soldered, for instance by means of a pair of hand-pliers, it is only necessary to apply heat, for instance by means of a soldering iron, a flame or a high-frequency field, in order to effect soldering without any possibility that the wires or bands to be joined will be displaced in relation to one another during the operation.

The joint remains rigid during soldering; the solder is drawn inside by capillary as soon as it becomes liquid, or else it passes to the conductors over the front arms of the primary layer 2.

It may be advantageous to cover the plate of the wire-clamp with a galvanic or other deposit of a metal resistant to oxidation, for instance tin or silver.

The dimensions of the device will be adapted to the wires to be soldered, the radius R of the inner rounded part being equal to or very slightly greater than that of the wires 1.

If the device is to be used for joining two metal strips, the radius R of the rounded part will be equal to or very slightly greater than the average thickness of the two strips in the case of a lap joint; in the case of a butt joint it will be equal to or very slightly greater than half the thickness of the thicker strip.

The basic metal 2 may be copper, brass, nickel, an alloy of these metals, or any other malleable metal with a melting point higher than that of the solder.

The composition of the solder depends on the nature of the metals to be joined, their melting points and the desired mechanical strength or electric resistance. This solder may be for instance a lead-tin alloy, a silver alloy or any other alloy capable of soldering the wires or strips to be joined.

Figure 1:
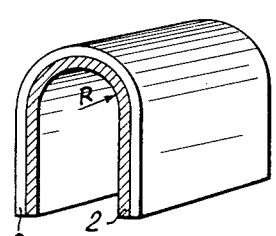
Figures 1 and 2 are a perspective view and a cross section respectively of a device consisting of solid plate.
Figure 3:
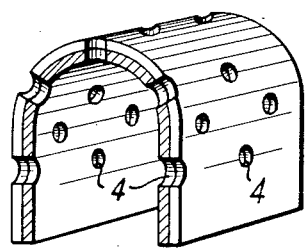
Figures 3 and 4 illustrate, in perspective, two alternative embodiments, both metallic layers (Figure 3) or one only (Figure 4) being perforated.
Figure 4:
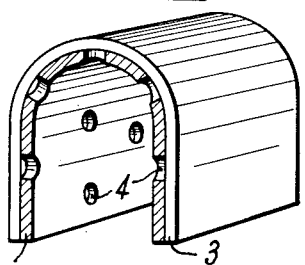

It is advantageous to perforate the bimetallic plates 2 and 3 with small holes 4, facilitating the displacement of the solder into the interior, as shown in Figures 3 and 4. These holes may be filled beforehand with a flux or solvent; in this manner, it is necessary only to heat the soldering device after having set it in place, in order to effect completely satisfactory soldering in a very short time without having to add either solder or flux. The holes made in the plate to facilitate the displacement of the solder into the interior during soldering either pass right through the bimetallic plate from one side to the other (Figure 3) or else pass through the primary metal only (Figure 4).

In the case of a soft solder (with a low melting point), the solvent (a resin for instance) will be deposited on the outer and inner surfaces of the wire-clamp and in the holes. In the case of a hard solder (with a high melting point), the flux (for instance borax) will be deposited in the same way in the form of paste or solution. In this latter case, the wire-clamps will be previously heated to a temperature sufficient to evaporate the solvent. If necessary, the solvent or flux may be added at the moment of soldering.

In order to simplify manufacture, the soldering device may consist of a tube instead of a channel, this tube being bimetallic with the solder 3 on the outside, as shown in Figures 5 and 6. After having been set in place over the conductors 1 to be soldered with overlapping, this tube assumes the form of a flattened O (Figure 6).

In the case of very small devices, it is not necessary to provide holes in the primary metal because the solder can easily be drawn in through the extremities and through the longitudinal slit 5 (Figure 7).

The joining of the conductors to be soldered is effected easily, without special tools, in exactly the position desired, either end to end (Figures 8 and 9) or with overlapping or juxtaposition of the extremities to be soldered (Figure 10). The joint has no tendency to loosen during soldering. The quantity of solder, which is fixed in advance, is sufficient but not excessive. The operation of soldering is thus very greatly systematised and simplified. Furthermore, the primary metal of the device is itself soldered to the wires or strips to be joined and thereby substantially increases the mechanical strength of the joint and its electrical conductivity.

What we claim is:

A solderable connector for wires and the like adapted grippingly to engage the ends of said wires for holding said wires while the wires are soldered to each other and to said connector, comprising an integral flexible unit formed from a malleable plate element bent to define an interior axial chamber for reception of the ends of the wires, said plate element having a higher melting point than solder but being bendable into gripping engagement with the wires to be soldered, said plate having adhered to its exterior surface a layer of solder and said plate and said solder being formed with a plurality of registering openings spaced about the periphery of the chamber and communicating with the chamber of said unit for the passage of solder from said layer into said chamber for contact with the wires therein.

BRUNO SIEGRIST.
CHARLES WAKKER.

References Cited in the file of this patent

UNITED STATES PATENTS

| Number | Name | Date |
|---|---|---|
| 1,078,791 | Maes | Nov. 18, 1913 |
| 1,202,115 | Stern | Oct. 24, 1916 |
| 1,429,703 | VanAllen | Sept. 19, 1922 |
| 1,506,971 | Bundy | Sept. 2, 1924 |
| 1,653,546 | Campbell | Dec. 20, 1927 |
| 2,493,940 | Ballou | Jan. 10, 1950 |
| 2,504,509 | Erickson | Apr. 18, 1950 |
| 2,504,512 | Esslie | Apr. 18, 1950 |